United States Patent
Liu et al.

(10) Patent No.: US 10,259,904 B2
(45) Date of Patent: Apr. 16, 2019

(54) BINDER FOR CAPACITIVE DEIONIZATION ELECTRODE AND METHOD FOR MANUFACTURING THE SAME

(71) Applicant: INDUSTRIAL TECHNOLOGY RESEARCH INSTITUTE, Hsinchu (TW)

(72) Inventors: Po-I Liu, Kaohsiung (TW); Li-Ching Chung, Changhua (TW); Teh-Ming Liang, Tainan (TW); Ren-Yang Horng, Hsinchu (TW); Hsin Shao, Zhubei (TW); Ruei-Shin Chen, Hsinchu (TW); Hsu-Tzu Fan, Shoufeng Township (TW); Chih-Hsiang Fang, Puzi (TW); Min-Chao Chang, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 387 days.

(21) Appl. No.: 14/983,117

(22) Filed: Dec. 29, 2015

(65) Prior Publication Data

US 2017/0174820 A1 Jun. 22, 2017

(30) Foreign Application Priority Data

Dec. 17, 2015 (TW) .............................. 104142429 A

(51) Int. Cl.
*C08G 18/66* (2006.01)
*C08G 18/76* (2006.01)
(Continued)

(52) U.S. Cl.
CPC ......... *C08G 18/7621* (2013.01); *C08G 18/36* (2013.01); *C08G 18/4854* (2013.01); *C08G 18/6696* (2013.01); *C02F 1/4691* (2013.01); *H01M 4/622* (2013.01); *Y02E 60/13* (2013.01)

(58) Field of Classification Search
CPC ............ C08G 18/6696; C08G 18/7621; C08G 18/621; C02F 1/4691
See application file for complete search history.

(56) References Cited

U.S. PATENT DOCUMENTS

2003/0232956 A1 12/2003 Brinkman
2004/0030060 A1* 2/2004 Sunkara ................. C08G 18/10
525/453
(Continued)

FOREIGN PATENT DOCUMENTS

TW 201543513 A 11/2015
WO WO 2008/016671 A2 2/2008

OTHER PUBLICATIONS

Chih-Hsiang Fang, Po-I Liu, Li-Ching Chung, Hsin Shao, Chia-Hua Ho, Ruei-Shin Chen, Hsu-Tzu Fan, Teh-Ming Liang, Min-Chao Chang, Ren-Yang Horng, A flexible and hydrophobic polyurethane elastomer used as binder for the activated carbon electrode in capacitive deionization, Desalination 399 (2016) 34-39, (Year: 2016).*
(Continued)

*Primary Examiner* — Bijan Ahvazi
(74) *Attorney, Agent, or Firm* — Birch, Stewart, Kolasch & Birch, LLP

(57) ABSTRACT

A binder for capacitive deionization electrode is provided, which is formed by reacting a polyether polyol, a diisocyanate, and a diol having a hydrophobic side chain. The binder may bind an electrode material and to form a capacitive deionization electrode. The electrode material and the binder may have a weight ratio of 90:5 to 90:25.

14 Claims, 6 Drawing Sheets

(51) Int. Cl.
    *C02F 1/469* (2006.01)
    *C08G 18/48* (2006.01)
    *C08G 18/36* (2006.01)
    *H01M 4/62* (2006.01)

(56) References Cited

U.S. PATENT DOCUMENTS

| | | | |
|---|---|---|---|
| 2009/0020430 A1 | 1/2009 | Yang et al. | |
| 2009/0318657 A1* | 12/2009 | Moriga | C08G 18/36 528/74.5 |
| 2011/0117442 A1 | 5/2011 | Kim et al. | |
| 2014/0016246 A1 | 1/2014 | Gadkaree et al. | |
| 2015/0175449 A1* | 6/2015 | Yang | C02F 1/4691 204/667 |

OTHER PUBLICATIONS

Taiwanese Office Action and Search Report for Taiwanese Application No. 104142429, dated Jul. 12, 2016.

Guerfi, A., "LiFePO4 water-soluble binder electrode for Li-ion batteries," Journal of Power Sources, 2007, vol. 163, pp. 1047-1052.
Kim, N.I. et al, "Correlation between positive-electrode morphology and sulfur utilization in lithium-sulfur battery," Journal of Power Sources, 2004, vol. 132, pp. 209-212.
Park, B.H. et al, "Capacitive deionization using a carbon electrode prepared with water-soluble poly(vinyl alcohol) binder," Journal of Industrial and Engineering Chemistry. 2011, vol. 17, pp. 717-722.
Park, B.H. et al, "Improvement in the capacitance of a carbon electrode prepared using water-soluble polymer binder for a capacitive deionization application," Electrochimica Acta, 2010, vol. 55, pp. 2888-2893.
Richner, R. et al, "Grafted and crosslinked carbon black as an electrode material for double layer capacitors," Carbon, 2002, vol. 40, pp. 307-314.
Yuca, N. et al, "A Systematic Investigation of Polymer Binder Flexibility on the Electrode Performance of Lithium-Ion Batteries," ACS. Appl. Mater. Interfaces, 2014. vol. 6, pp. 17111-17118.
Zheng, H. et al. "Cooperation between Active Material, Polymeric Binder and Conductive Carbon Additive in Lithium Ion Battery Cathode," J. Phys. Chem., 2012, vol. 116, pp. 4878-4882.

* cited by examiner

BINDER FOR CAPACITIVE DEIONIZATION ELECTRODE AND METHOD FOR MANUFACTURING THE SAME

CROSS REFERENCE TO RELATED APPLICATIONS

The present application is based on, and claims priority from, Taiwan Application Serial Number 104142429, filed on Dec. 17, 2015, the disclosure of which is hereby incorporated by reference herein in its entirety.

TECHNICAL FIELD

The technical field relates to an electrode and relates to a binder in the electrode.

BACKGROUND

In preparation of a carbon electrode, a polymer binder is usually used to adhere electrode material particles and bind the electrode material particles to a current collector. Because the adhesive effect of the polymer binder dramatically influences the electrode performance, tailoring the polymer binder properties is very important. Fluorine based polymers usually serve as the binder for preparing the electrode, in which the polyvinylidene fluoride (PVDF) is the most popular. The advantage of the PVDF binder is that it can maintain the electronic integrity of the entire electrode through mechanically holding the active materials and additives together. In addition, an appropriate amount of the PVDF binder will not negatively influence the electrochemical properties of the active material. However, the PVDF binder still has other shortcomings such as high cost, rigidness, and environmental unfriendly.

Accordingly, a novel binder composition is called for to replace the PVDF binder applied to adhere the electrode material particles and bind the electrode particles to the current collector.

SUMMARY

One embodiment of the disclosure provides a binder for a capacitive deionization electrode, being formed by reacting a hydrophobic polyether polyol, a diisocyanate, and a diol having a hydrophobic side chain.

One embodiment of the disclosure provides a method of forming a binder for a capacitive deionization electrode, comprising: mixing a hydrophobic polyether polyol, a diisocyanate, and a diol having a hydrophobic side chain to react to form a binder.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein.

DETAILED DESCRIPTION

Figure 1A:
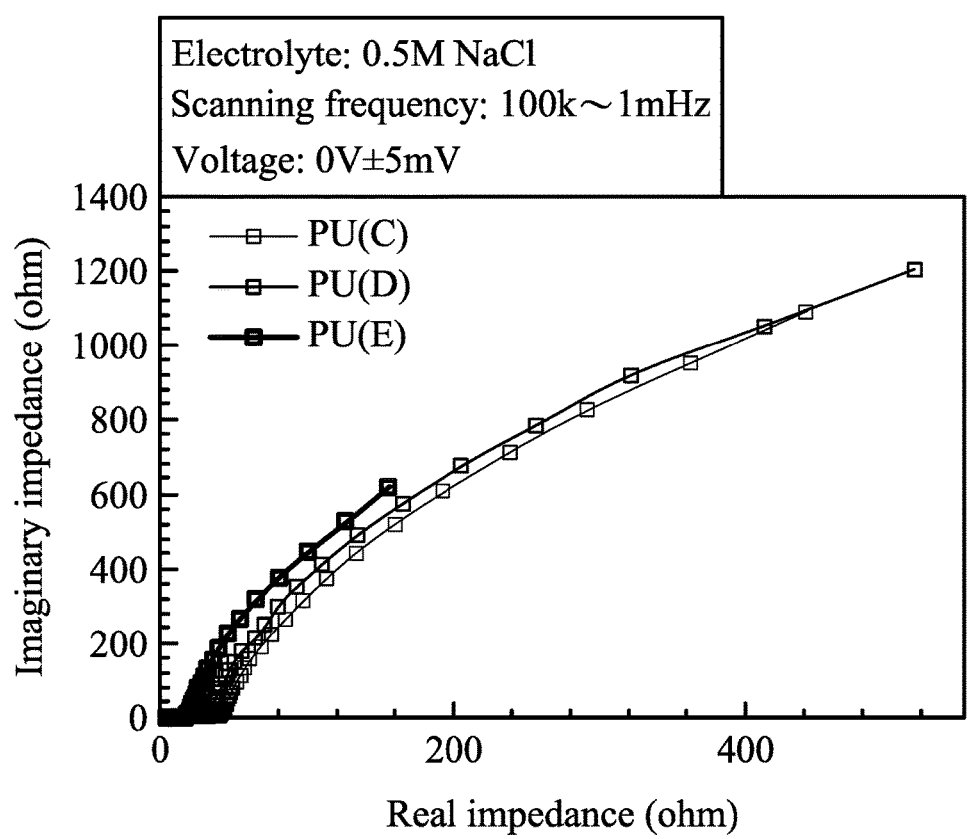
FIG. 1A shows curves of imaginary impedance versus real impedance of PU electrodes with different molecular weights.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In one embodiment, a polyurethane (PU) elastomer is polymerized of 1 part by mole of hydrophobic polyether polyol (HO—$R^2$—OH), 3 to 20 parts by mole of a diisocyanate (OCN—$R^1$—NCO), and 1 to 6 parts by mole of a diol having a hydrophobic side chain (HO—$R^3$—OH), as shown in Formula 1.

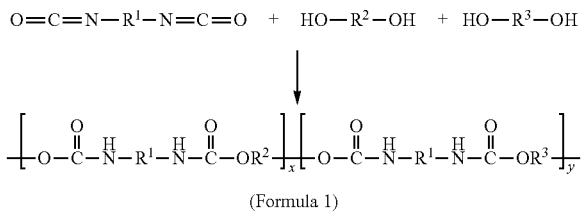

(Formula 1)

In Formula 1, $R^1$, $R^2$, and $R^3$ depend on the types of the diisocyanate, the hydrophobic polyether polyol, and the diol having the hydrophobic side chain. x and y depend on the molar ratio of the hydrophobic polyether polyol and the diol having the hydrophobic side chain. On the other hand, the PU is a random copolymer, wherein the repeating unit corresponding to x and the repeating unit corresponding to y are randomly arranged. In one embodiment, the hydrocarbon backbone of the hydrophobic polyether polyol is highly flexible and hydrophobic. The diol having the hydrophobic side chain may serve as a segment for controlling the hardness of the PU, and the hydrophobic side chain may increase the waterproof properties of the PU (serving as a binder). In one embodiment, the PU has a number average molecular weight (Mn) of at least $1.6 \times 10^5$. A PU with an overly low Mn cannot efficiently adhere an electrode material to form an electrode. A PU with an overly high Mn has an overly high viscosity and an overly low structural elasticity, which is not suitable to prepare a paste for an electrode and has the declined electrode performance.

For example, the diisocyanate can be hexamethylene diisocyanate, toluene diisocyanate, methylenediphenyl diisocyanate, or a combination thereof. The hydrophobic polyether polyol can be polytetramethylene ether glycol, polypropylene glycol, or a combination thereof. The hydrophobic polyether polyol is highly flexible and hydrophobic. In one embodiment, the hydrophobic polyether polyol has a Mn of 1000 to 5000. A hydrophobic polyether polyol with an overly low Mn forms a harder and more brittle PU, and the PU is not easily compatible to other object. A hydrophobic polyether polyol with an overly high Mn forms a softer PU having a weak coherence strength. The diol having the hydrophobic side chain can be $C_{12-26}$ monoglyceride, $C_{12-26}$ fatty acid dimer, or a combination thereof. The diol having the hydrophobic side chain may serve as a hard segment of the PU to control its hardness. In GMS diol, its side chain hydrocarbon makes it have extremely hydrophobic. The non-crystallinity characteristics of GMS can also provide flexibility and wetting of the produced polyurethane elastomer. The very low solubility of water in GMS also effectively reduces its hydrolysis tendency of the produced polyurethane elastomer. The hard domain formed by reacting GMS diol plays the role in adhesion to the substrate. The incorporation of side chain hydrocarbon in GMS diol can leads polyurethane elastomer to have a more phase mixing structure between hard and soft segments, which can result in the enhancement of adhesive properties of the polyurethane elastomer.

In one embodiment, 90 parts by weight of the active material, 5 to 25 parts by weight of a binder (such as the PU), and solvent (e.g. N-methyl-2-pyrrolidone (NMP), isopropanol, ethanol, or a combination thereof) can be mixed to form a paste. The paste can be coated onto a current collector (e.g. copper, aluminum, titanium, another metal, or a combination thereof) and then be dried, thereby completing an electrode. Too little binder cannot efficiently adhere the active material and a conductive material to the current collector, such that peeling can occur. Too much binder may increase the resistance of the electrode and therefore degrading the electrode performance. For example, the active material can be a material with high specific surface area such as activated carbon material, carbon nanotube, graphene, or a combination thereof. The active material may have a specific surface area of 300 $m^2/g$ to 3000 $m^2/g$ and a pore size of 1 nm to 1000 nm. An overly small specific surface area of the active material may negatively influence the electrical adsorption capability of ions. If the conductivity of the active material is insufficient, e.g. the activated carbon material, 5 to 20 parts by weight of a conductive material can be further added to enhance the electrode conductivity. The conductive material can be graphite, carbon black, acetylene black, carbon nanotube, graphene, or a combination thereof. Note that too much conductive material (e.g. graphite or carbon black) will reduce the weight ratio of the activated carbon material, such that the effective surface of the activated carbon material for adsorbing ions is reduced, and the adsorption capacitance of the electrode is reduced.

The PU has excellent thermal stability and high chemical stability while being dried, and the dried PU can be wet by electrolyte. As such, the electrode including the PU serving as the binder can be widely applied. In one embodiment, the electrode may collocate with an opposite electrode and an aqueous solution serves as electrolyte (salted water) for capacitive deionization. Alternatively, the electrode including the PU serving as the binder can be utilized in other devices such as a lithium battery, a fuel cell, a super capacitor, or a hydrogen storage device.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

Example 1

1 part by mole of polytetramethylene ether glycol (PTMEG, Mn=2000, commercially available from Lidye Chemical Co., Ltd.) and 3 parts by mole of glyceryl monostearate (GMS) were added in 300 mL of anhydrous NMP, and the heated to 70° C. to form a homogeneous solution. The solution was then cooled to 50° C., and 3 parts by mole of toluene diisocyanate (TDI) was then added to the solution. After the temperature of the solution became stable, the solution was then heated to 70° C. and reacted at 70° C. for 3 hours. Thereafter, the solution was sampled every hour to check the residual amount of the —NCO group in the reactants. When the residual amount of the —NCO group was not reduced any more, a solvent was added to dilute the product, and additional TDI could be added to increase the molecular weight of the product by a chain extension reaction several times to obtain the polyurethanes (PU) elastomer with different molecular weight (Mn). The PTMEG and the TDI (total amount of the original TDI and the additional TDI) had a molar ratio of 1:6 to 1:16. The PU products are symbolized as PU(A) with 6 parts by mole of the TDI, PU(B) with 7 parts by mole of the TDI, PU(C) with 8 parts by mole of the TDI, PU(D) with 10.5 parts by mole of the TDI, and PU(E) with 13.5 parts by mole of the TDI, and the Mn of these PU products are shown in Table 1.

80 parts by weight of activated carbon (AC) serving as an active material, 10 parts by weight of graphite powder (commercially available from EMAXWIN) serving as a conductive material, and 10 parts by weight of a PU solution (15 wt %) from one of the PU(A) to PU(E) serving as a binder were evenly stirred for 24 hours to form a paste. The paste was then coated on a titanium foil (with a thickness of 50 μm) by a blade (with a coating gap of 300 μm), and then dried in an oven at 120° C. for 4 hours to fabricate a PU electrode.

Comparative Example 80 parts by weight of activated carbon (AC) serving as an active material, 10 parts by weight of graphite powder (commercially available from EMAXWIN) serving as a conductive material, and 10 parts by weight of a poly (vinylidene fluoride) solution (5 wt %, Mn=534000, commercially available from Aldrich) serving as a binder were evenly stirred for 24 hours to form a paste. The paste was then coated on a titanium foil (with a thickness of 50 μm) by a blade (with a coating gap of 300 μm), and then dried in an oven at 120° C. for 4 hours to fabricate a PVDF electrode.

The basic requirement of the binder is an excellent adhesive to the active material with a high specific surface area, the conductive material, and the current collector. The peel strength of the activated carbon coating to the titanium foil (serving as a current collector) was measured by a universal tensile strength machine. The carbon electrode was cut to a strip with a width of 2.5 cm. A standard tape was adhered onto the strip and then laminated by a roller (2 kg) forth and back three times, thereby obtaining a T peel test specimen. Remove the tape by seizing the free end and pulling it off (30 cm/min) back upon itself at as close to an angle of 180° as possible on a universal testing machine. A small peel-off work load was down initially; as the testing proceeded, this value fluctuated until an electrode failed. This value is the peel strength (unit: g/25 mm), as shown in Table 1.

TABLE 1

(Peel strength of activated carbon to titanium foil for the PU binders with different Mn)

| Binder | Mn (measured by GPC) | Peel strength (g/25 mm) | Peel phenomenon of the carbon layer |
| --- | --- | --- | --- |
| PU (A) | $9.9 \times 10^4$ | 0 | Completely peeled from the titanium foil |

TABLE 1-continued (Peel strength of activated carbon to titanium foil for the PU binders with different Mn)

| Binder | Mn (measured by GPC) | Peel strength (g/25 mm) | Peel phenomenon of the carbon layer |
|---|---|---|---|
| PU (B) | $1.1 \times 10^5$ | 0 | Completely peeled from the titanium foil |
| PU (C) | $1.6 \times 10^5$ | 10 | Completely peeled from the titanium foil |
| PU (D) | $>1.6 \times 10^5$ | 30 | Peeled from the titanium foil. Small part of the carbon layer was remained on the titanium foil |
| PU (E) | $>1.6 \times 10^5$ | 90 | Carbon layer remained on two sides of the sample |
| PVDF | $5.3 \times 10^5$ | 10 | Completely peeled from the titanium foil |

The PU(A) and PU(B) with a lower Mn cannot form a film due to their soft and viscous properties, such that the electrode utilizing the same could not be formed as a complete film. As such, the activated carbon coating was easily peeled from the current collector, and the intermolecular interaction of the activated carbon and the PU(A) and the PU(B) were low. As shown in the peel strength test result, the PU binder with a lower Mn had a low adhesion strength. The peel strength of the PU-bonded carbon layer increases with the molecular weight of PU elastomer and higher than that of PVDF-bonded carbon layer for some higher molecular weight PU elastomer. The improvement in the flexibility of the PU can contribute to the peel strength. On the other hand, the reason for higher adhesive strength of the PU-E carbon slurry may be due to the high polarity of urethane group and urea-linked in moisture cured PU elastomer matrix. In general, high molecular weight is also a prerequisite for a good mechanical and binding property, which is stringently required for a polymer binder of the AC electrode.

Thereafter, the capacitances of the PU electrodes and the PVDF electrode were measured by the cyclic voltammetry (CV) method, in which the test solution was NaCl aqueous solution (0.5 M), the working electrode had an area of 1 cm×1 cm, the opposite electrode was platinum wire, the reference electrode was AgCl/Ag electrode, the potential scanning range was −0.5 V to 0.5 V, and the scanning rate was 10 mV/s. The CV curve was integrated to obtain the total voltammetric charge, which was divided by the potential window and the weight of active material in the electrode to obtain a specific capacitance of the electrode.

As shown in the peel test, the PU(A) and the PU(B) with a lower Mn cannot be formed as complete electrodes to measure their specific capacitances. As shown in Table 2, when the Mn of the PU binder was increased, the coating uniformity and the adhesion strength of the electrode was also improved. For example, the specific capacitance of the PU electrodes was increased from 54.0 F/g to 91.1 F/g. Because the PU binder with a high Mn could form a network structure and bind the particles in a wide range, such that the particles are interconnected to each other by the network support. A longer PU molecular chain may prevent the pores of the activated carbon material from being blocked by a small molecular binder, thereby increasing the specific capacitance.

TABLE 2

| Binder | Activated carbon:graphite:PU binder | Electrode uniformity | Adhesion property | Specific capacitance (F/g) |
|---|---|---|---|---|
| PU (C) | 80:10:10 | High | Middle | 54.0 |
| PU (D) | 80:10:10 | High | Middle | 63.8 |
| PU (E) | 80:10:10 | High | High | 91.1 |

Figure 1B:
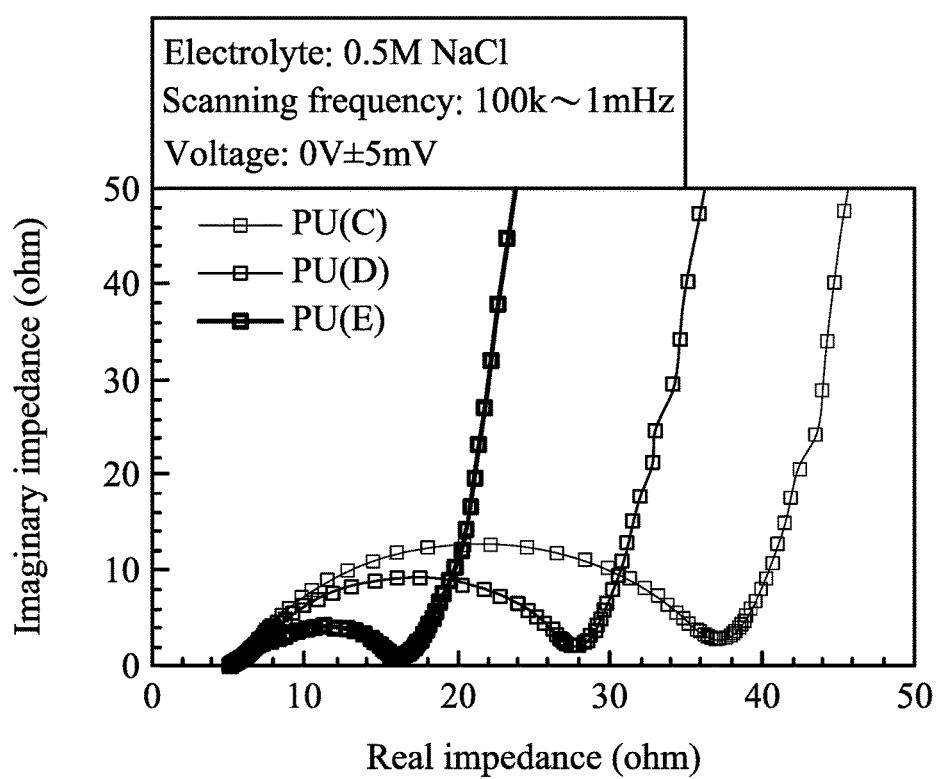
FIG. 1B is a partial enlargement of FIG. 1A.
Figure 2:
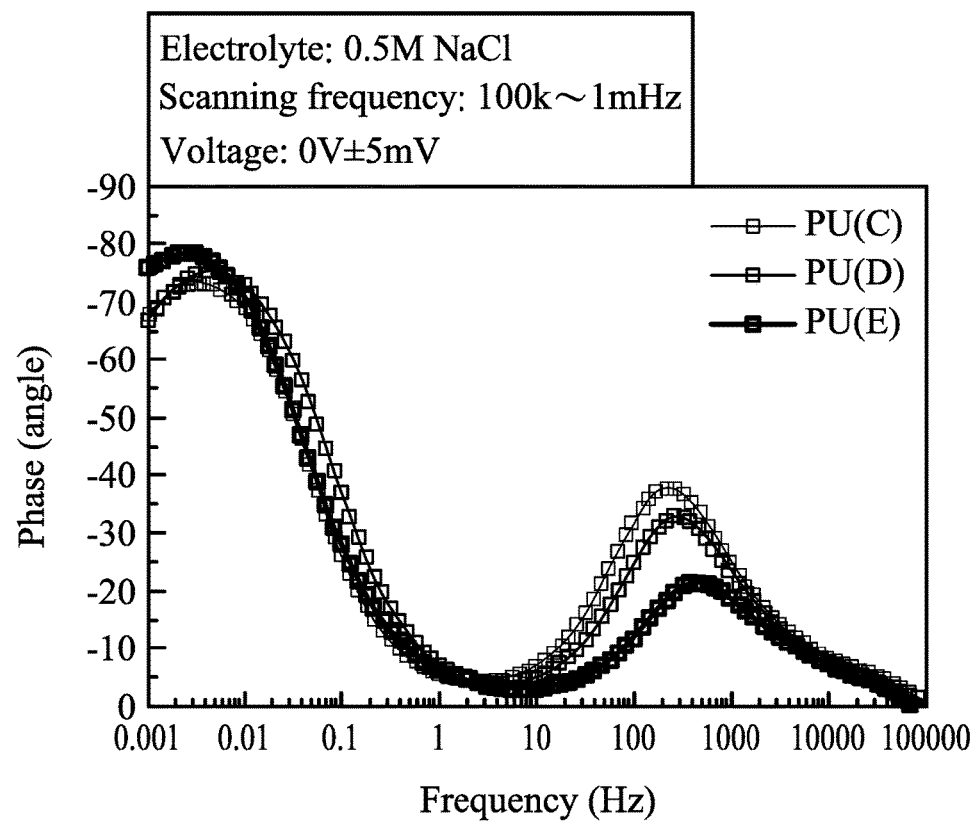
FIG. 2 shows curves of phase angle versus frequency of the PU electrodes with different molecular weights.

In addition, the impedances of the PU electrodes with different Mn were analyzed by electrochemical impedance spectroscopy (EIS), as shown in FIGS. 1A and 1B. FIG. 1B is a partial enlargement of FIG. 1A. The longitudinal axis in FIGS. 1A and 1B corresponds to the capacitance characteristics of the electrodes, and the horizontal axis in FIGS. 1A and 1B corresponds to the resistance of the electrodes. As shown in FIG. 1A, the electrode prepared by the PU(E) binder (with a higher Mn) had the lower interfacial resistance at the middle-high frequency domain (e.g. semi-circle region) than the electrode prepared by the PU(C) and the PU(D) binders (with a lower Mn). The curves of the phase angle versus different frequencies of the electrodes are shown in FIG. 2. At a low frequency domain, the PU(E) electrode had the phase angle higher than that of the PU(C) and PU(E) electrodes. It means that the PU(E) electrode tended to a capacitive behavior. The above phenomenon should be a result of the following reasons: the longer molecular chain of the PU(E) could not easily enter the pores of the activated carbon material, thereby preventing the pores from blocking and benefiting to reduce the surface resistance of the carbon coating. Accordingly, the PU(E) electrode had a higher specific capacitance.

Example 2

The weight ratio of the activated carbon and the graphite powder was fixed at 80:10, and the addition amount of the PU binder was changed from 5 to 20 parts by weight to investigate the influence of the PU binder ratio on the electrode capacitance, as shown in Table 3. The experiments results show that the carbon electrode had a middle level of adhesion when the carbon material, the conductive material, and the PU had a weight ratio of 80:10:5. The adhesion of carbon electrode was enhanced by increasing the PU binder ratio. In addition, all the carbon electrodes with different PU binder ratios had high uniformity. The carbon electrodes had similar specific capacitances when the activated carbon and the PU binder had weight ratios of 80:10, 80:15, and 80:20. Moreover, the carbon electrodes had the highest specific capacitance of 101 F/g when the activated carbon and the PU binder had a weight ratio of 80:15. Note that the carbon electrodes had the lowest specific capacitance of 67.1 F/g when the activated carbon and the PU binder had a weight ratio of 80:5. It is estimated that when the PU binder ratio was too low, the ineffective connection between the carbon particles and the titanium foil (current collector) occurred, thereby causing a larger interfacial resistance to negatively influence the capacitance of the electrode. On the other hand, overloading of PU-(E) binder can cause an increase in resistivity because of the insulating property of the polymer.

TABLE 3

| Binder | Activated carbon:graphite:PU binder | Electrode uniformity | Adhesion | Specific capacitance (F/g) |
|---|---|---|---|---|
| PU (E) | 80:10:5 | High | Middle | 67.1 |
|  | 80:10:10 | High | High | 91.1 |
|  | 80:10:15 | High | High | 101.0 |
|  | 80:10:20 | High | High | 94.8 |

Example 3

The PU(E) electrode and the PVDF electrode were selected to perform the CV analysis, as shown in Table 4. The PVDF electrode had a specific capacitance of 87.3 F/g, and the PU(E) electrode had a specific capacitance of 91.1 F/g higher than that of the PVDF electrode.

TABLE 4

| Binder | Activated carbon:graphite:PU binder | Electrode uniformity | Adhesion | Specific capacitance (F/g) |
|---|---|---|---|---|
| PU (E) | 80:10:10 | High | High | 91.1 |
| PVDF | 80:10:10 | High | High | 87.3 |

Figure 3A:
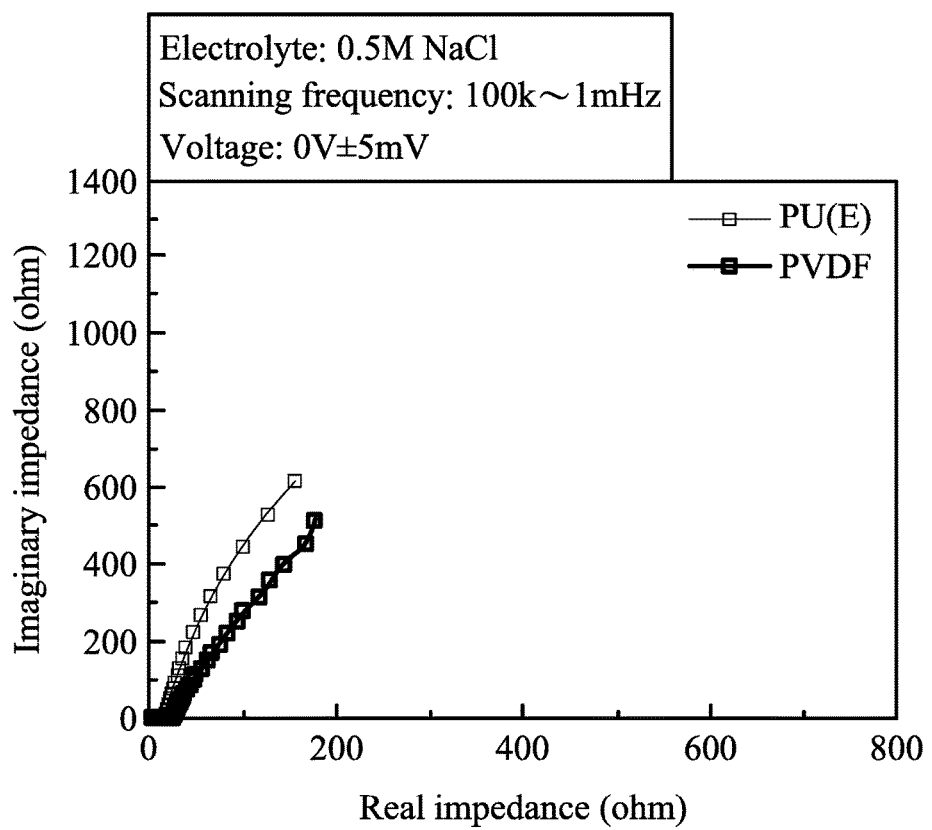
FIG. 3A shows curves of imaginary impedance versus real impedance of the PU electrode and the PVDF electrode.
Figure 3B:
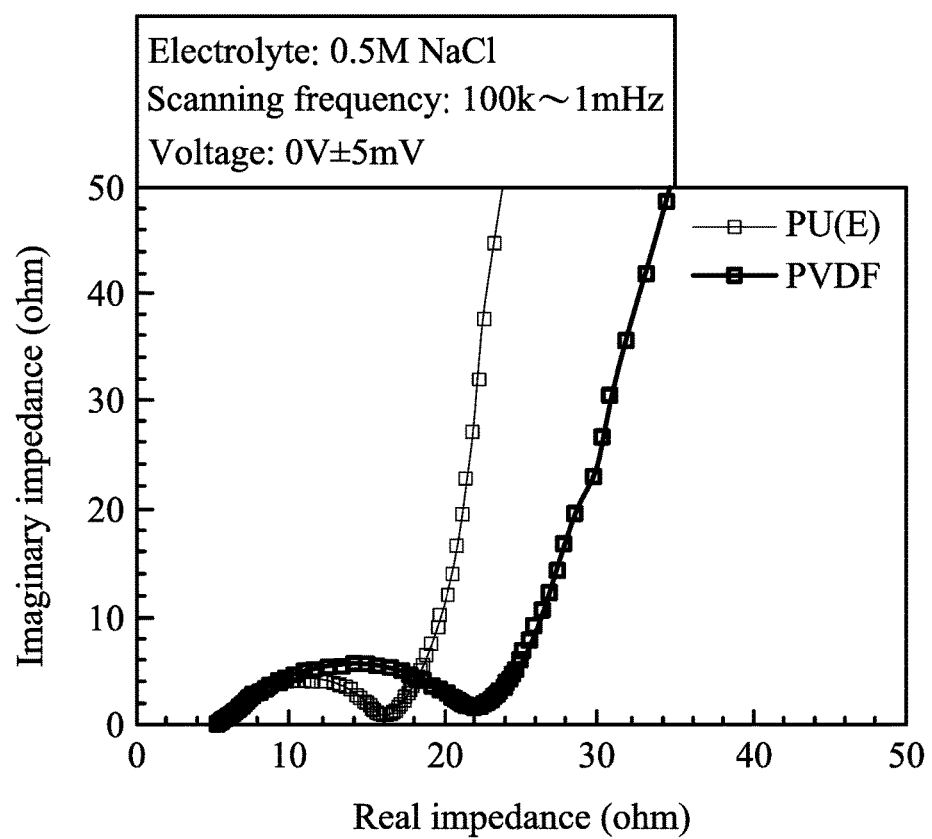
FIG. 3B is a partial enlargement of FIG. 3A.
Figure 4:
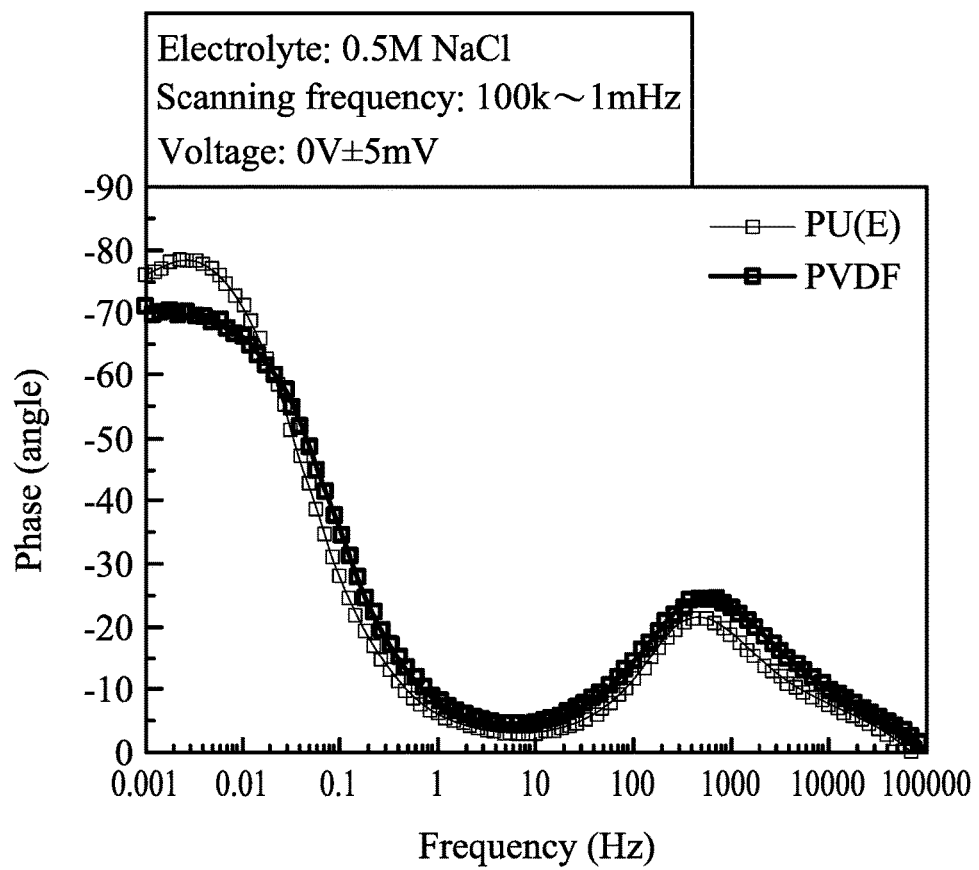
FIG. 4 shows curves of phase angle versus frequency of the PU electrode and the PVDF electrode.

In addition, the impedances of the PU electrode and the PVDF electrode were analyzed by electrochemical impedance spectroscopy (EIS), as shown in FIGS. 3A and 3B. FIG. 3B is a partial enlargement of FIG. 3A. As shown in FIG. 3A, the electrode prepared by the PU(E) binder had the lower interfacial resistance at the middle-high frequency domain (e.g. semi-circle region) than the PVDF electrode. High flexibility of polymer chain in PU(E) and higher adhesive strength of PU(E) electrode is responsible for the lower interfacial resistance. In other words, the PU(E) electrode had better electrical and ionic conduction, resulting in the higher specific capacitance. The curves of the phase angle versus different frequencies of the electrodes are shown in FIG. 4. At a low frequency domain, the PU(E) electrode had a phase angle close to 90° than that of the PVDF electrode. Compared to the PVDF electrode, the PU(E) electrode tended to a capacitive behavior, such that the electrode prepared with the binder of the PU(E) had the higher specific capacitance than the PVDF electrode. Accordingly, the PU may substitute for the PVDF to serve as the binder for the active material in the electrode.

It will be apparent to those skilled in the art that various modifications and variations can be made to the disclosed methods and materials. It is intended that the specification and examples be considered as exemplary only, with the true scope of the disclosure being indicated by the following claims and their equivalents.

What is claimed is:

1. A binder for a capacitive deionization electrode, being formed by reacting substances consisting essentially of a hydrophobic polyether polyol, a diisocyanate, and a diol having a hydrophobic side chain,
   wherein the binder has a number average molecular weight of greater than $1.6 \times 10^5$,
   wherein the diol having the hydrophobic side chain comprises $C_{12-26}$ monoglyceride, $C_{12-26}$ fatty acid dimer, or a combination thereof, and
   wherein the hydrophobic polyether polyol and the diisocyanate have a molar ratio of 1:3 to 1:20, and the hydrophobic polyether polyol and the diol having the hydrophobic side chain have a molar ratio of 1:1 to 1:6.

2. The binder as claimed in claim 1, wherein the diisocyanate comprises hexamethylene diisocyanate, toluene diisocyanate, methylenediphenyl diisocyanate, or a combination thereof.

3. The binder as claimed in claim 1, wherein the hydrophobic polyether polyol comprises polytetramethylene ether glycol, polypropylene glycol, or a combination thereof.

4. The binder as claimed in claim 1, wherein the hydrophobic polyether polyol has a number average molecular weight of 1000 to 5000.

5. The binder as claimed in claim 1, being applied to adhere an active material in an electrode, wherein the active material includes activated carbon material, carbon nanotube, graphene, or a combination thereof, and the active material and the binder have a weight ratio of 90:5 to 90:25.

6. The binder as claimed in claim 5, wherein the active material has a specific surface area of 300 $m^2$/g to 3000 $m^2$/g and a pore size of 1 nm to 1000 nm.

7. The binder as claimed in claim 5, wherein the electrode further comprises 5 to 20 parts by weight of a conductive material, and the conductive material includes graphite, carbon black, acetylene black, carbon nanotube, graphene, or a combination thereof.

8. A method of forming a binder for a capacitive deionization electrode, comprising:
   mixing a hydrophobic polyether polyol, a diisocyanate, and a diol having a hydrophobic side chain to react to form the binder according to claim 1.

9. The method as claimed in claim 8, wherein the diisocyanate comprises hexamethylene diisocyanate, toluene diisocyanate, methylenediphenyl diisocyanate, or a combination thereof.

10. The method as claimed in claim 8, wherein the hydrophobic polyether polyol comprises polytetramethylene ether glycol, polypropylene glycol, or a combination thereof.

11. The method as claimed in claim 8, wherein the hydrophobic polyether polyol has a number average molecular weight of 1000 to 5000.

12. The method as claimed in claim 8, wherein the binder is applied to adhere an active material in an electrode, wherein the active material includes activated carbon material, carbon nanotube, graphene, or a combination thereof, and the active material and the binder have a weight ratio of 90:5 to 90:25.

13. The method as claimed in claim 12, wherein the active material has a specific surface area of 300 $m^2$/g to 3000 $m^2$/g and a pore size of 1 nm to 1000 nm.

14. The method as claimed in claim 12, wherein the electrode further comprises 5 to 20 parts by weight of a conductive material, and the conductive material includes graphite, carbon black, acetylene black, carbon nanotube, graphene, or a combination thereof.

* * * * *